United States Patent [19]

Wasielewski

[11] Patent Number: 4,472,904
[45] Date of Patent: Sep. 25, 1984

[54] RODENT TRAP WITH IMPROVED SENSITIVITY

[75] Inventor: Louis Wasielewski, Des Plaines, Ill.

[73] Assignee: Star-Trap, Incorporated, Elk Grove Village, Ill.

[21] Appl. No.: 383,830

[22] Filed: Jun. 1, 1982

[51] Int. Cl.³ ............................................ A01M 23/30
[52] U.S. Cl. .......................................... 43/81; 43/83.5; 43/82
[58] Field of Search ....................... 43/83.5, 81, 82, 83

[56] References Cited

U.S. PATENT DOCUMENTS

| 869,594 | 10/1907 | Stone | 43/81 X |
|---|---|---|---|
| 907,516 | 12/1908 | May | 43/83.5 |
| 1,223,271 | 4/1917 | Grubbs | 43/81 |
| 1,675,532 | 7/1928 | Cessna | 43/83.5 |
| 2,022,625 | 11/1935 | Mahoney | 43/83.5 |
| 2,188,297 | 1/1940 | Graybill | 43/81 |
| 2,225,254 | 12/1940 | Bowen | 43/83.5 |
| 2,241,948 | 5/1941 | Graybill | 43/83.5 |
| 2,348,251 | 5/1944 | Graybill | 43/83.5 |
| 2,428,721 | 10/1947 | Peterson | 43/83.5 |
| 2,735,216 | 2/1956 | Stebbins | 43/83.5 |
| 2,867,939 | 1/1959 | Evans | 43/83.5 |
| 3,204,366 | 9/1965 | Weimer | 43/83.5 |
| 3,640,015 | 2/1972 | Fisher | 43/83.5 |
| 4,306,369 | 12/1981 | Margulies | 43/81 |

FOREIGN PATENT DOCUMENTS 210114  8/1957  Australia ................................ 43/81

Primary Examiner—Nicholas P. Godici
Assistant Examiner—Kurt Rowan
Attorney, Agent, or Firm—Howard H. Darbo

[57] ABSTRACT

A rodent trap is disclosed having a pivotally mounted bait carrier with a catch hole, a cam surface and a magnetic flap biased to an initial trap setting position by a magnet. Thumb pressure is applied to a spring-biased striking bar comprising a major loop and a minor loop wherein the end of a trigger-setting arm is caused to bear down on the cam surface thereby pivotally moving the bait carrier flap substantially from the effect of the magnet and the trigger arm end enters the catch hole and sets the trap.

An alternative bait carrier is disclosed which is mounted to the base for wobbly movement so that the lateral as well as vertical movements of the bait arm are effective to spring the trap. The bait carrier and trigger setting arm end cooperatively engage in such a manner as to automatically align the wobbly bait carrier during the trap setting procedure.

13 Claims, 14 Drawing Figures

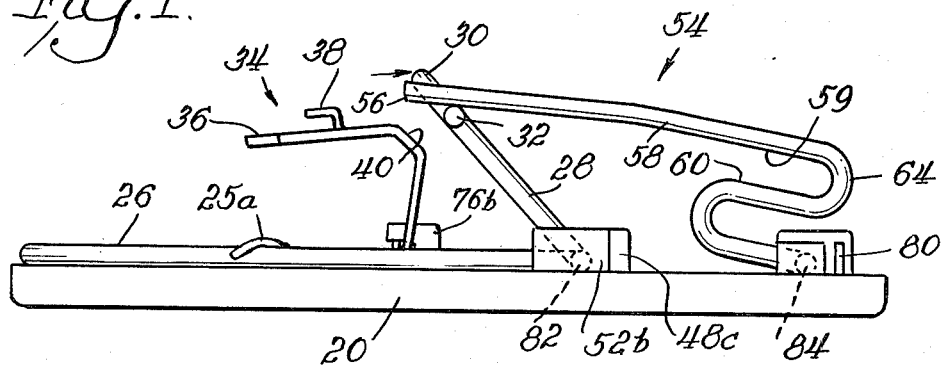
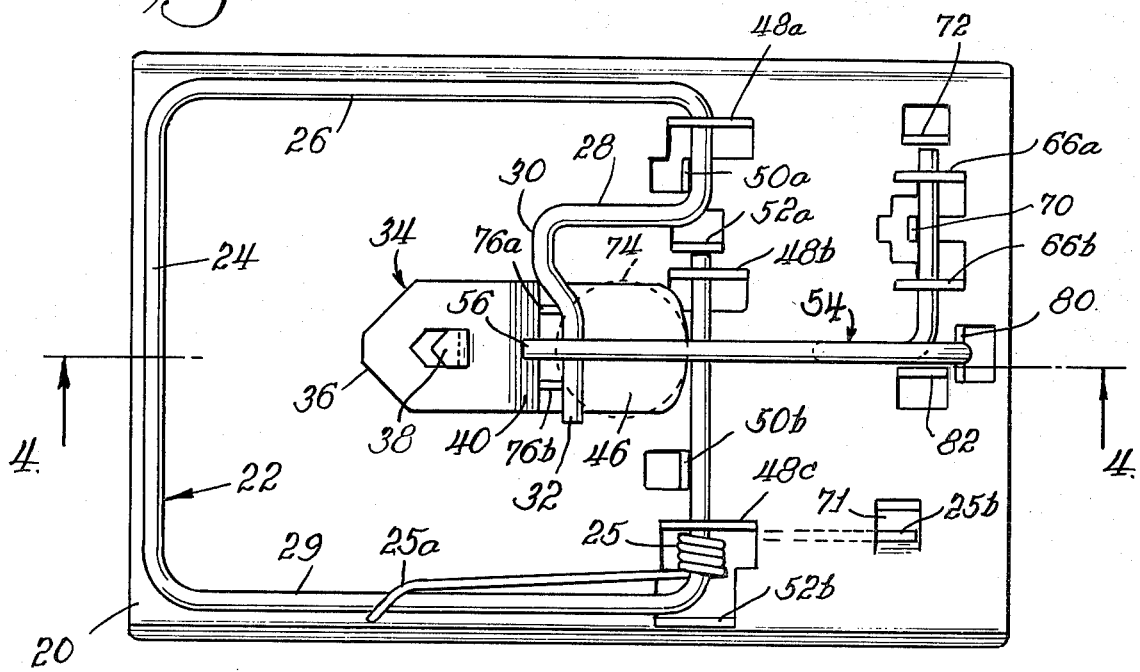
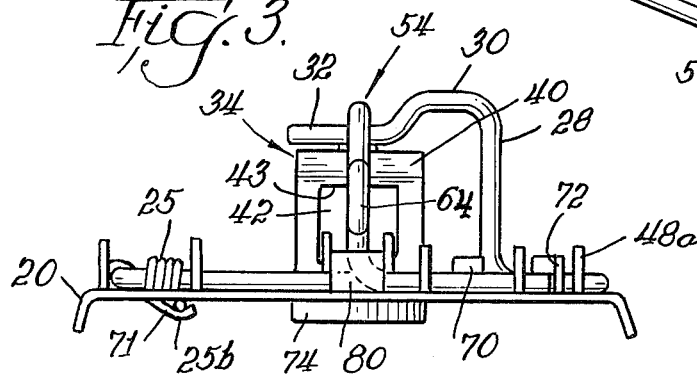
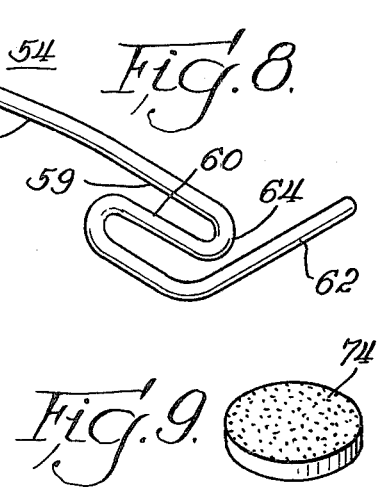
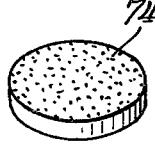

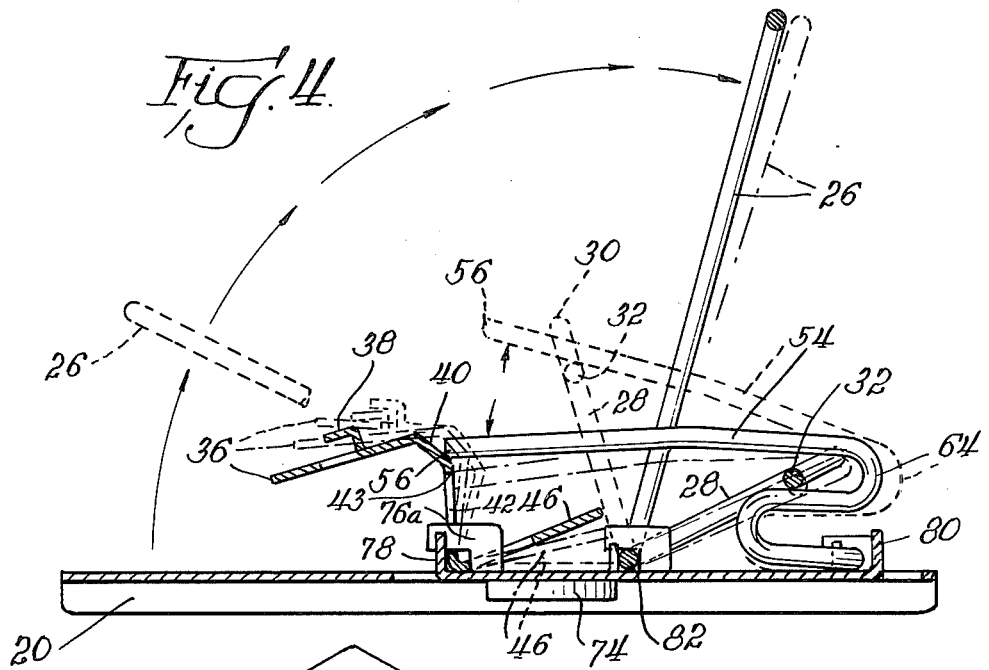
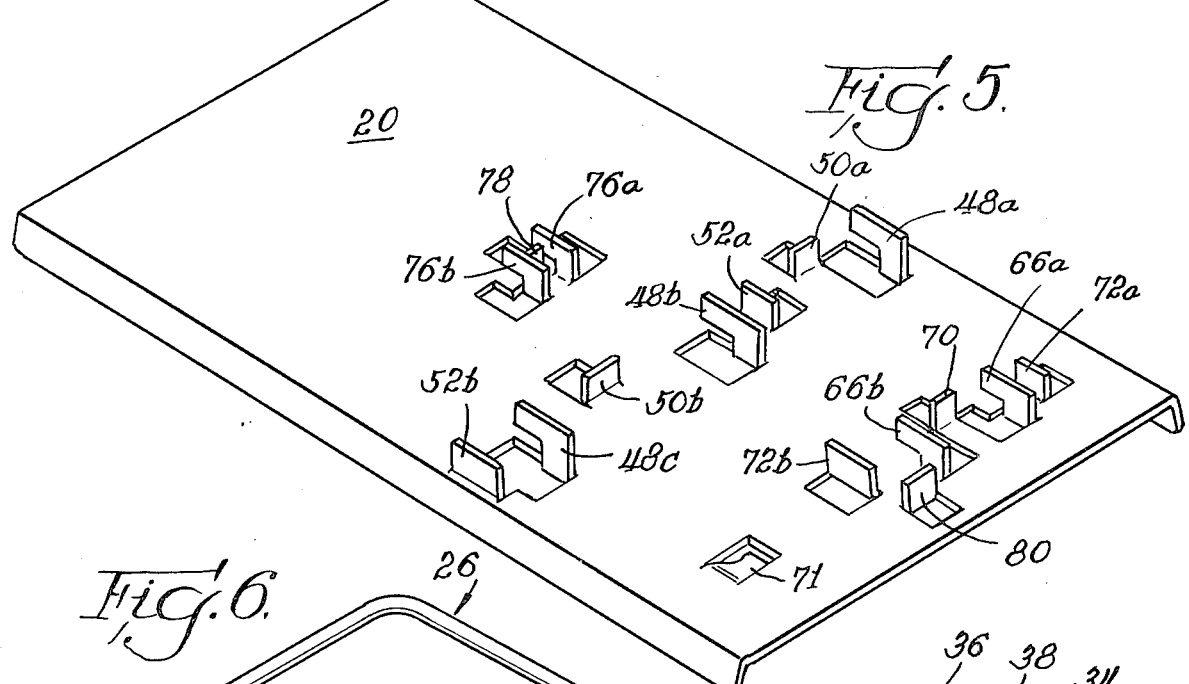
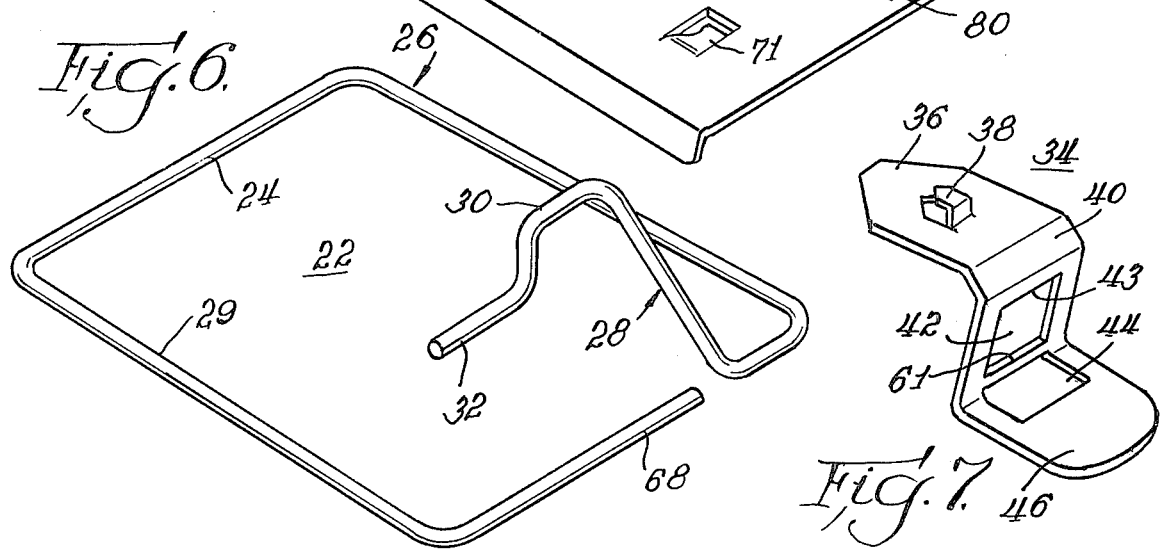

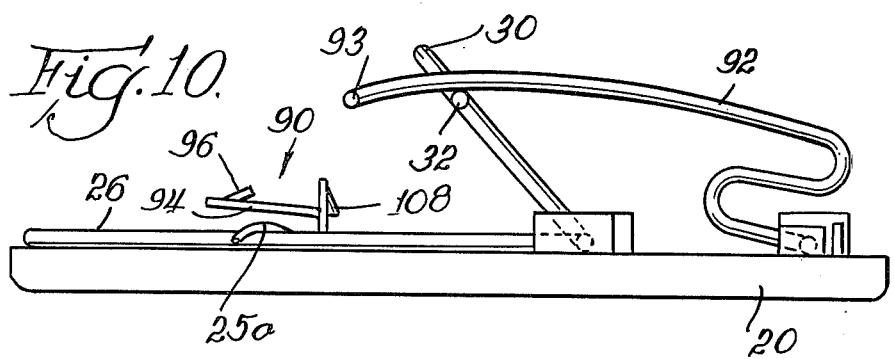
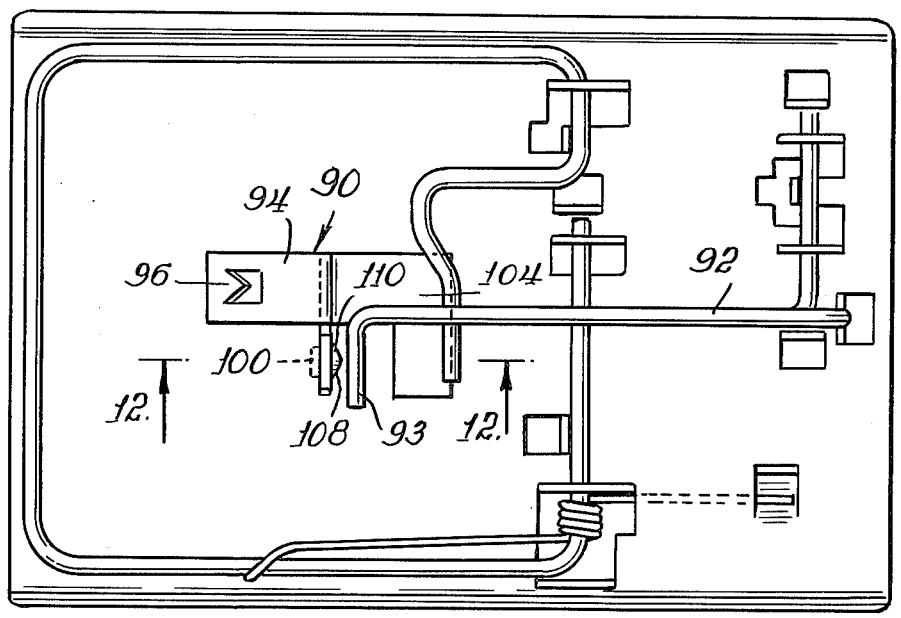
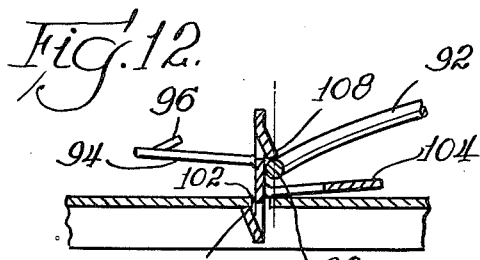
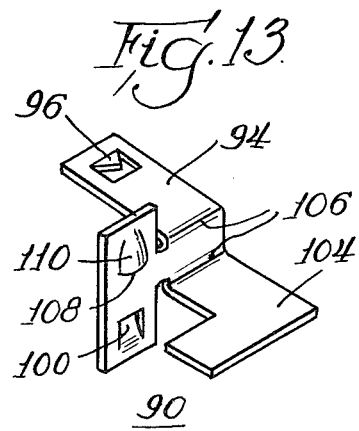
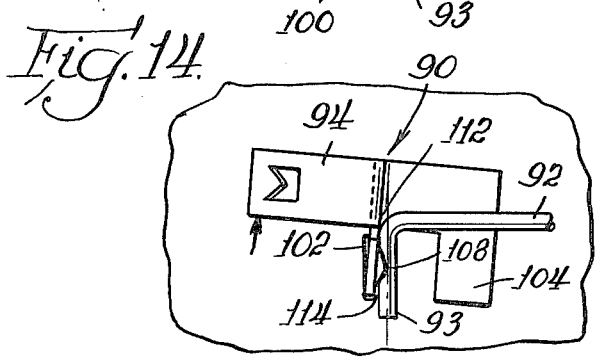

RODENT TRAP WITH IMPROVED SENSITIVITY

BACKGROUND OF THE INVENTION

The present invention relates to a trap for destroying small rodent-type animals.

Rodent traps of the type which employ finger settable spring-biased wire loops to trap a rodent which has actuated a baited trigger mechanism are well known in the art. Such traps, as compared to cages, are especially advantageous as the rodent is instantly destroyed upon being caught and is available to be disposed of immediately, and do away with having to search for its body through odor detection, such as with the use of poisons.

The successful operation of these types of rodent traps depends in a large part on the sensitivity of the baited trigger to the touch of a rodent to release the spring loaded wire loop before the rodent can escape. The challenge in the design of a sensitive rodent trap is to simplify the construction and assembly thereof for economic purposes while yet keeping the trigger mechanism rugged and highly sensitive to the slightest touch of a rodent.

A corollary challenge to the foregoing is to design a sensitive bait carrier trigger mechanism without the use of spring means or counterbalance weights to bias the biat carrier to an initial position such that the trap can be set without using both hands of the user. The drawback with using spring means or counter balance weights is that the sensitivity of the trigger mechanism is reduced because these bias forces act in a direction opposing the force exerted by the rodent in attempting to eat the bait. The rodent must, therefore, exert a force on the bait carrier in excess of the force resulting from the friction of the bait carrier moving parts.

There exists rodent traps, such as those manufactured by Victor and readily available at supermarkets, which employ bait carriers that are mounted to a base for wobbly movement, but are so arranged as to require both hands to set. This trap, while being simple in construction, requires it to be set in such a manner that there is an inherent danger of finger injury upon an inadvertent release of the wire loop striking bar.

Many approaches have been taken in the art to circumvent the problem of providing a trap settable without the use of both hands, but by and large those attempts have resulted in the use of spring means or counter weights to bias the bait carrier to a predetermined position. For instance, U.S. Pat. No. 2,022,625 discloses a rodent trap settable with the fingers of one hand but still utilizes a spring wire to keep the bait carrier in a raised position. U.S. Pat. No. 907,516 employs a similar principle in imparting an upward tendency on the bait carrier. Fully disclosed in U.S. Pat. Nos. 903,296 and 1,250,022 are animal traps using counter balancing weights for forcing the respective bait carriers to assume a predetermined position so that the other hand of the user need not be used to manipulate the bait support and trigger for cooperative engagement thereof.

Other conventional animal traps, such as that disclosed in U.S. Pat. No. 1,541,856, are of the type which require both hands for setting the trap, as well as a bait carrier counter balance weight and spring means for biasing the trigger arm to a predetermined position.

With the foregoing in mind, it is a primary object of the present invention to provide a rodent trap of one embodiment with an improved bait carrier biasing mechanism having a greater overall sensitivity to touch than those biased by springs or counterbalance weights.

Yet another object of the invention is to provide a rodent trap which employs a uniquely constructed bait carrier and catch mechanism for reducing the friction between the various surfaces to thereby reduce the force required to spring the trap.

It is a further object of the present invention to provide an improved bait carrier and catch mechanism of another embodiment which is responsive to sideways bait carrier movement as well as vertical movement for releasing the trigger mechanism and springing the trap. It is a corrolary object of the foregoing to provide automatic aligning means for use in self-aligning the improved bait carrier during the trap-setting step so that the trap can be set by squeezing it between the finger and thumb of one hand.

In both embodiments, the trap-setting mechanism is so arranged that the user's fingers, during the setting operation, are removed from the striking bar zone of movement thereby preventing injury to the fingers.

The foregoing objects, as well as others, and the means by which they are achieved through the present invention, may be best appreciated by referring to the detailed description of the invention which follows hereinafter together with the appended drawings.

SUMMARY OF THE INVENTION

In accordance with the stated objects, the present invention incorporates into the trigger mechanism a magnet for biasing a magnetic bait carrier to an initial position. However, in setting the trap, the trigger setting arm urges the bait carrier away from the magnet an amount sufficient to substantially reduce the effect of the magnetic attraction on the bait carrier. The force required by the rodent in tripping the bait carrier catch mechanism is substantially that of the friction of the moving parts. In addition, even the friction between the trigger setting arm and the bait carrier catch mechanism is minimized by utilizing a circular trigger arm engaging a straight surface edge of the bait carrier thereby reducing the surface contact therebetween.

The construction of the present invention is simplified by employing a striking bar assembly pivotally mounted to the base of the trap and spring biased by a single spring toward such base. The striking bar includes two free ends, one of which is formed into a major loop for trapping and destroying a rodent, and the other free end is formed into a minor loop for applying finger pressure thereto when setting the trap.

A trigger setting arm having an intermediate portion formed into a serpentine configuration is pivotally mounted to the base such that the free end of the minor loop is captured in the serpentine section and the minor loop movement occasioned by thumb pressure causes the trigger arm end to bear upon a cam surface of the bait carrier and pivot it away from the magnet. The continued movement of the minor loop causes the trigger arm end to become inserted into a square catch hole located directly below the cam surface, thereby setting the trap. The trigger arm serpentine section maintains the minor loop, and thus the major loop in the set or cocked position until a rodent trips the bait carrier.

In another embodiment of the invention, there is further provided a bait carrier mounted to the base for wobbly movement thereof such that lateral movement, as well as vertical movement of the bait carrier, is effective to trip the catch mechanism. The catch mechanism is comprised of a small length of the circular trigger arm engagable under a semi-circular catch lobe fixed on a vertically flat surface of the bait carrier. The trigger arm and the flat surface under the catch lobe are biased together in such a manner that they aligningly contact during the trap-setting step and thereby restore a wobbled bait carried to a proper position.

BRIEF DESCRIPTION OF THE DRAWINGS

FIG. 1 is a side view of the present invention in the rest position.

FIG. 2 is a top plan view of the rodent trap illustrating the fixation of the various components by the use of tabs partially punched out of the base material.

FIG. 3 is a back view of the rodent trap illustrating the minor loop of the striking bar and the trigger setting arm.

FIG. 4 is a sectional side view, taken along line 4—4 of FIG. 2, showing the relative positions of the trap components in various stages of setting the trap.

FIG. 5 is an isometric view of the rodent trap metal base, with all the components removed, showing the punch-out tabs.

FIG. 6 is an isometric view of the striking bar assembly, particularly showing the formation therein of the major and minor loops.

FIG. 7 is an isometric view of one embodiment of the bait carrier.

FIG. 8 is an isometric view of the trigger setting arm showing the serpentine section.

FIG. 9 is an isometric view of the magnet utilized as the bait carrier biasing element.

FIG. 10 is a side view of the present invention illustrating another embodiment of the bait carrier and catch mechanism.

FIG. 11 is a top view of the other embodiment of the invention.

FIG. 12 is a partial sectional view, taken along line 12—12 of FIG. 11, showing the bait carrier catch in engagement with a section of the round trigger arm.

FIG. 13 is an isometric view showing the other embodiment of the bait carrier and catch mechanism.

FIG. 14 is a segmented top view of the other embodiment of the invention showing the trigger setting arm in engagement with the bait carrier which has been wobbled sideways.

DETAILED DESCRIPTION OF THE INVENTION

With reference now to FIGS. 1 and 2, there is shown the rodent trap constructed in accordance with one embodiment of the present invention. As primary components of the present invention there is included a base 20 to which is pivotally mounted a bait carrier, generally designated 34, a striking bar assembly with a major loop 26 and minor loop 28, a trigger setting arm 54, and a single torsion spring 25.

FIG. 2 distinctly depicts the arrangement of these components on the base together with the punch-out tabs some of which allow pivotal movement of the parts, and some of which restrict lateral movement or pivotal movement of an associated component. With brief reference to FIG. 2 in conjunction with FIG. 5, it should be noted that none of the rodent trap components are threaded through holes in the base tabs, but rather to simplify assembly certain components are journaled by sliding the component into the proper overhanging tabs and crimping other tabs to capture the component therein. It can be seen that the assembly operation is accomplished by simply inserting the various components into their respective overhanging tabs and crimping the various other tabs upwardly.

Specifically, the rodent trap can be assembled by first installing the spring 25 onto the major loop free end 68 with its hooked end 25a biased against the major loop side arm section 29. The striking bar assembly 22 is then inserted into overhanging tabs 48a, 48b and 48c. Tabs 50a and 50b are turned upwardly to capture the striking bar assembly 22 and for pivotal movement therein. Tabs 52a and 52b are crimped upwardly to prevent transverse movement of the striking bar assembly with respect to the base 20. Spring anchor tab 71 can then be crimped over the spring straight end 25b as shown in FIG. 3.

The bait carrier 34 shown in FIG. 7, and particularly the axle member 61 separating the square catch hole 42 and void 44 is inserted into overhanging tabs 76a and 76b. The upturning of tab 78 allows pivotal movement of the bait carrier 34 about a horizontal axis. The trigger setting arm 54, shown in isolation in FIG. 8, is inserted into overhanging tabs 66a and 66b with the end section 56 thereof disposed over the free end 32 of the striking bar assembly minor loop 28. Tab 70 is bent upwardly to capture the pivotal shaft section 62 of the trigger setting arm, and tabs 72a and 72b are turned upwardly to prevent transverse movement thereof. Tab 80 can be turned upwardly either before or after the assembly of the trigger setting arm 54. The curved end 64 of the trigger setting arm 54 abuts the top of tab 80 thereby limiting the pivotal movement of the arm 54 so that it does not swing backwardly too far and out of engagement with the minor loop free end 32. In accordance with one aspect of the invention, the trigger setting arm 54 is maintained in its operating position, on the one hand by the abutment of tab 80 and on the other hand by pivotally mounting such arm 54 at its extreme end so that gravity acting upon it eliminates the need for spring biasing means.

Central to another aspect of the invention there is provided a magnet 74 (FIG. 9) which is suitably fastened, such as by adhesive bonding, on the bottom side of the base 20 and directly under the bait carrier flag 46, as shown in FIG. 2. The magnet 74 can be, for instance, of the metal or ceramic type whose magnetic force is, of course, not substantially affected by the metallic base material between the bait carrier flap 46 and the magnet 74.

By the use of the structure just described, it should be seen that the construction of the present invention is simplified insofar as there is no need for additional counterbalance weights, other than the necessary components themselves, nor is there required a plurality of springs which necessitate a connection point at each end thereof. However, the use of these simple components has not resulted in a compromise in the advantages desired in a rodent trap.

Considering now the striking bar assembly 22, it is of critical importance to note that the formation thereof does not require the two free ends 32 and 68 to be joined by welding or by twisting the two ends together. The striking bar assembly 22 is preferably constructed of a heavy steel wire of sufficient stiffness such that the minor loop 28 does not flex considerably with respect to the major loop 26. The major loop 26 is formed generally into a rectangular configuration somewhat smaller than the base 20 toward which it is biased by the torsion spring 25. The striking bar minor loop 28 which is shown in FIG. 3 includes a raised thumb portion 30 for easy access in applying pressure thereto to pivot the striking bar assembly into a set position.

Without further detail, it should be understood that a suitable bait is secured to the bait carrier 34 by simply securing it between the bait arm 36 and the pointed bait retainer 38, or impairing it directly on the retainer 38.

The setting of the rodent trap is best described by referring primarily to FIG. 4 as well as to FIGS. 1 and 8. The initial rest positions of the major loop 26 and minor loop 28 are shown in FIG. 1. This position is forcefully assumed by reason of the torsion spring hooked end 25a biasing the side arm section 29 of the major loop against the base 20. The minor loop is formed at about a forty-five degree angle with respect to the major loop 26 which angle conveniently permits the user to grasp the trap with the thumb on the raised portion 30 and the fingers below rear of the base 20, and with a squeezing action therebetween overcome the torsion spring bias and move the major and minor loops into a cocked position as shown by the solid lines in FIG. 4. In this figure, it is to be noted that the major loop 26 first passes through the position shown in solid lines to the dot-dash line position, and then back to the solid line position.

The magnetic field of magnet 74 attracts the magnetic flap 46 of the bait carrier 34 such that the flap is held snugly against that portion of the base lying directly above the magnet 74. In accordance with an important feature of the present invention, the magnet 74 is provided for its ease of attachment to the base, and more importantly, because of the relationship between the attractive force of the magnet 74 on the flap 46 and the various distances separating the two elements. It is a well known principle in magnetics theory that the magnetic forces exerted between two objects is inversely proportional to the distance squared between the two objects. Because of this force-distance relationship, the attractive magnetic force exerted by a magnet on a magnetic metal is the greatest when there is no air gap and thus the distance is zero, e.g., touching. As the metal is moved away from the magnet, the force exerted thereon decreases in a relationship according to the square of the distance, rather than a linear or constant relationship which exists in many springs and counterbalance weights.

Optimally it would be desirable to utilize a mechanism for strongly biasing the bait carrier 34 to an initial position, but once removed from that position to a set position, the force would be reduced so that the rodent would not have to exert an opposing force of large magnitude to trip the catch mechanism. As noted earlier, it is a common practice to employ spring means or counter weights in forcing the bait carriers to their respective initial positions. In these applications, the force exerted on the bait carrier as a function of distance, does not decrease, and may even increase.

It is therefore seen that the use of a magnet 74 in this application is ideally suited. To that end, a relatively large force is exerted on the bait carrier flap 46 to maintain it in an initial position. With reference to FIGS. 1 and 7, the bait carrier 34 is bent at angles such that when the flap 46 is in contact with the base, the vertically directed section leans backwardly somewhat and the bait arm 36 hangs downwardly somewhat. In this respect, it is noteworthy that the bait carrier is constructed such that in the set position the masses of the bait arm 36 and the flap 46 are somewhat symmetrical about the axle 61 thereby eliminating any counterweight effect which the rodent would have to overcome. The large force which maintains the bait carrier in the initial position is highly advantageous insofar as it provides a solid "feel" to the trap in the setting stage when the bait carrier is first moved from the initial position toward the set position. Because the pressure exerted by the thumb on the minor loop is large, the additional pressure due to the magnet and flap in magnetic contact is very distinct to the thumb and therefore the user is confidently assured that the trap is being set properly, as well as functioning properly. This is in contrast to the spring and counterweigt biasing methods where, if it is desired to use weak springs or light counterweights to increase sensitivity, the small additional setting pressures may go unnoticed to the user in the setting stage as compared to the large pressure of the wire loop spring. In the instant invention, however, the large force between the magnet and flap is substantially reduced when the flap 46 is moved away from the magnet 74 in the set position thereby maintaining a high degree of sensitivity. It will be described next the manner in which the bait carrier flap 46 is moved away from the magnet in the trap setting procedure so as to require less force acting upon it by the rodent to trip the catch mechanism.

From FIG. 1, it can be observed that a tangential force applied to the raised thumb portion 30 of the minor loop in the direction of the arrow produces pivotal movement of the striking bar assembly about horizontal axis 82. The movement of the trigger setting arm 54, about axis 84, is governed by the engagement of the free end 32 of the minor loop on the underside 58 of the trigger setting arm. In the latter stages of striking bar assembly movement, the movement of the trigger setting arm 54 is governed by the engagement of the free end 32 on the upper surface 60 of the trigger setting arm serpentine section. The engagement of the minor loop free end with these trigger setting arm surfaces causes a first upward pivotal movement of the arm, and then a downward pivotal movement as shown in FIG. 4.

In FIG. 4, the dash-dash lines illustrate the rodent trap component positions in the early stage of the setting procedure. The solid lines represent that stage of the trap setting procedure where the minor loop free end 32 engages the trigger setting arm surface 60 thereby causing the end section 56 thereof to bear down upon the bait carrier cam surface 40 and pivot the bait carrier and thus the flap 46 away from the magnet 74. The continued movement of the minor loop by the application of thumb pressure applied to it, forces the end portion 56 to move down on the cam surface 40 and eventually into the bait carrier square catch hole 42. It should be understood that the magnetic force exerted by the magnet 74 upon the bait carrier flap 46, albeit much reduced in strength, is sufficient to prevent the bait carrier 34 from falling forward and away from the trigger setting arm. Therefore, in the setting procedure, as the trigger setting arm end section 56 clears the upper flat edge 43 of catch hole 42 in its downward stroke, such end section 56 will be projected into the catch hole 42 and the upper edge thereof 43 will prevent reverse pivotal movement of the trigger setting arm.

The trigger setting arm 54 engaged in the belt carrier catch hole 42 forms a catch mechanism which prevents rotation of the arm 54 about its axis 84 until such time as the bait carrier bait arm 36 is moved downwardly by a rodent trying to remove the bait from the retainer 38. The rodent trap components shown in dot-dash lines in FIG. 4 illustrate the relative positions thereof when the catch mechanism is engaged with the trigger setting arm 54.

After the catch mechanism becomes operative to latch the trigger setting arm 54, thumb pressure on the minor loop raised portion 30 may be released, allowing the striking bar assembly 22 to pivot a short distance in the forwardly direction until it is stopped by the minor loop free end 32 coming in contact with the upper surface 59 of the upper serpentine loop of the trigger setting arm. The trigger setting arm 54 being immovable by reason of the catch mechanism maintains the minor loop free end 32, and thus the striking bar assembly 22, from further pivoting in the forwardly direction. The rodent trap of the present invention is now fully set such that it can be placed at a location where it is desired to trap a rodent.

As noted before, the trap is sprung by the application of a downward force upon the bait arm 36. In keeping with the invention, it is desired to maintain that amount of downward pressure necessary to trip the catch mechanism as small as possible to obtain a highly sensitive trigger. To that end, the bait carrier 34, the trigger setting arm end section 56, and the catch mechanism are constructed to reduce those frictional forces which tend to oppose the downward pressure applied by the rodent upon the bait arm 36. These opposing forces are reduced in several ways. The bait carrier axle member 61 is formed simply by punching therein holes 42 and 44. The punching process automatically forms the axle member 61 into a square cross-sectional configuration such that the surface contact of such member in its overhanging flaps 76a, 76b and tab 78 is reduced thereby minimizing the friction therebetween. It is also advantageous that the bait carrier 34 is loosely journaled between the mentioned tabs and the base 20.

Yet another reduction in the frictional forces is obtained by minimizing the area of contact between the trigger setting arm end section 56 and the engaging surface 43 of bait carrier catch hole 42. The area of contact between these two surfaces is minimized by providing a rounded upper surface on the end section 56 of the trigger setting arm, together with a flat upper catch hole edge 43. It should be observed that it is especially important to minimize this surface area as the trigger arm end section 56 is biased upwardly against the catch hole edge 43 as an indirect result of the torsion spring 25 forcing the striking bar assembly to a closed position.

By use of the structure described above, it is seen that a multitude of aspects have been considered in reducing those forces which the rodent must overcome in releasing the catch and trigger mechanism. The minimization of these forces increases the sensitivity of the trigger mechanism and thereby substantially increases the probability of trapping a rodent once it has come in contact with the bait carrier.

Moving now to FIGS. 10-14, there is shown an embodiment of the bait carrier and catch mechanism mounted for wobbly movement. In this embodiment, the striking bar assembly and the base are substantially identical to that described above, except for the manner in which the bait carrier 90 is mounted to the base 20. As noted in FIG. 11, the trigger setting arm 92 includes an end section 93 orthogonal to the elongate arm which end section is effective in realigning the bait carrier in the trap setting step from a wobbled position so as to be able to set the trap with one hand.

In FIG. 13, the bait carrier generally designated 90, is stamped and formed out of a single piece of metal stock. Within the bait arm 94, a pointed punch-out tab 96 is bent somewhat upwardly to retain the bait thereon. To the side of the bait carrier, and formed as a part thereof, is an upright support member 98 for movably mounting the bait carrier to the base 20. At a position in the base as shown in FIG. 11, a slot 102 (FIG. 14) is punched into the base 20 of a size somewhat larger than the cross-sectional size of the upright support member 98. The support member includes a punch-out tab 100 which is bent outwardly (as shown in FIG. 12) after the support member 98 has been installed in its respective base slot 102. Tab 100 thereby prevents the removal of the bait carrier 90 from the base 20. A counterweight 104 is provided to counter balance the effect of the bait arm 94 about the bait carrier's mounting point, as provided by the upright member 98, and additionally, bias the bait carrier to an initial position.

The bait carrier 90 includes opposing bends at corners 106 so as to resemble a stair step. This structure permits the counterweight corner bend to act as a pivotal axis resting upon the base 20 while at the same time its elevating bait arm 94 above the base an amount sufficient to permit the application of downward force on the bait arm 94 to pivot the carrier about the noted pivotal axis. It is significant to note in FIG. 12 that the slot 102 in the base is sufficiently wider than the thickness of the support member 98 such that the support member can be "wobbled" sideways within the slot. This embodiment of the bait carrier therefore permits sideways movement of the bait arm as well as vertical movement. It will be discussed below the manner in which the end section 93 of the trigger setting arm engagably co-acts with the bait carrier such that the wobbly movement of the carrier in either direction is effective to trip the catch mechanism.

In FIG. 11 and FIG. 13 a rounded punch-out lobe 108 is made in the upper part of the upright support member 98. This punch-out is formed as a lobe with a flat underside and functions as a catch coacting with the trigger setting arm end section 93. In the construction of the catch lobe 108, there is formed a cam surface 110 existing between the flat upright surface of the support member 98 and the outermost peripheral edge of the rounded catch lobe surface.

The rest position of the bait carrier 90 is shown in FIG. 12 where it is seen that the counterweight 104 maintains the bait arm 94 pivoted to a position elevated above the base 20 surface. The trigger setting arm 92 is operatively moved into the set position by the minor loop free end 32 as previously described. During the setting operation, the trigger setting arm 92 if moved downwardly whereby the curved free end 93 first engages the catch lobe cam surface 110 (pivoting the bait carrier 90 slightly) and then it slides beyond the outer edge of the catch lobe 108 and becomes caught under the lobe. With particular reference now to FIG. 12, it should be noted that the trigger setting arm end section 93 is constructed of an circular rod having a radius somewhat smaller than the distance by which the catch lobe 108 under surface projects beyond the surface of the upright support member 98. These members being dimensioned as such assure that once the curved surface of the arm end section 93 is caught under the catch lobe 108, it will not inadvertently slip out due to the upwardly directed bias on the trigger setting arm 92. It should further be noted that once a rodent urges the bait arm 94 in a downwardly direction, the bait carrier is pivoted slightly away from the trigger arm end section 93 whereby the catch lobe 108 begins to travel along the downward curvature of the arm end section 93, the effect of which is to aid in releasing the trigger arm end portion from beneath the catch lobe 108. In other words, once the bait arm 94 is pivoted slightly downwardly, the outermost edge of the rounded catch lobe 108 is caused to descend the downhill curvature of the arm end section 93 which, once started, is augmented by the upwardly directed force on the trigger setting arm.

It should now be appreciated that this structure results in a trigger mechanism which is highly sensitive to small vertical movements of the bait arm 94. Since the bait carrier 90 is constructed of a light weight material itself, only relatively small forces applied to the bait arm 94 are effective to produce these corresponding small movements.

Before proceeding with the description relating to the sideways tripping action of the catch mechanism, it should be pointed out in connection with FIG. 11 that in assuring a proper engagement of the arm end section 93 under the catch lobe 108, the upright support member should be in exact parallel alignment with the axis of the end section 93. The structure of this embodiment of the present invention provides for the automatic alignment of the bait carrier 90 with respect to the trigger setting arm end section 93 during the trap setting procedure. Self alignment of the bait carrier is effected by providing, at the end of the trap setting arm, the small elongate end section 93 the end-most curved surface which bears against the flat surface of the upright support member 98 just below the catch lobe. As shown in FIG. 12, the upright member 98 and the counterweight 104 are not bent as exactly a ninety degree angle. This prevents the counterweight 104 from resting on the base 20 during the setting procedure, and because of that, the weight thereof produces a clockwise pivotal effect on the bait carrier so as to urge the flat upright support member 98 against the end most lengthwise surface of the trigger setting arm end section 93.

Moreover, the upwardly biased trigger setting arm 92, when engaged under the catch lobe 108, has a tendency to be "jammed" under the lobe in the corner thereof and thus against the upright support member surface. These two elements being urged together as described tend to effect a contact along the entire length of the arm end section 93 thereby automatically aligning the upright support member 98 without having to use one hand to manipulate the trigger arm into proper engagement with the catch mechanism.

The bait carrier 90, being mounted for wobbly movement, is responsive to the sideways movement of the bait arm 94 to release the trigger arm end section 93 from beneath the catch lobe 108. This aspect of the invention is shown in FIG. 14 where a force has been applied in the direction of the arrow to swivel the bait arm 90 sideways about the wobbly base slot 102. The bent corner of the end section 93 is thereby leveraged by the external force against the upright support member at point 112 which has the effect of moving the outermost edge of the catch lobe 108 onto the downhill side of the end section 93 curvature. This movement has the same effect as before described in augmenting the release of the trigger setting arm section 93 from beneath the catch lobe 108. The length of the arm end section 93, and thus the distance between the center of the catch lobe and the point of leverage 112 is chosen such that relatively small sideways movements of the bait arm 94 are effective to release the trigger arm from the catch mechanism and spring the trap. A force applied to the bait arm 94 in the direction opposite the arrow is effective to cause the end section 93 to be leveraged against the upright support member at point 114 and release the trigger arm from the catch lobe as described before.

In summary, an improved rodent trap has been provided which includes a magnet for strongly biasing the magnetic bait carrier to an initial position but which biasing force is reduced when the carrier is moved to its set position. The unique structure of the bait carrier is effective in reducing the friction of its contacting surfaces. An open ended striking bar assembly is provided which eliminates the need to join such ends by welding or twisting them together. Moreover, provided is a bait carrier mounted for wobbly movement, and a means for aligning the bait carrier for proper engagement with the trigger mechanism during the trap setting step such that only one hard is needed to completely set the trap.

While the invention has been shown and described with reference to two specific exemplary embodiments, there is no intention that it be limited to the particular aspects or details of such embodiments. On the contrary, it is intended here to cover all modifications, alternatives, equivalents and subcombinations which fall within the spirit and scope of the invention as defined in the appended claims.

What I claim is:

1. A rodent trap, comprising:
   a base;
   a stiff wire having free ends, one free end thereof being formed into a major loop and pivotally mounted to said base, the other free end being formed into a minor loop and pivotal about the major loop pivotal axis;
   spring means for biasing said major loop to a closed position against said base;
   a bait carrier pivotally mounted to said base for pivotal movement between an initial position and a set position, said bait carrier including a catch and a cam surface disposed above said catch;
   bias means for biasing said bait carrier to said initial position;
   a trigger arm with a catch engaging end, said trigger arm being movably mounted to said base at a position wherein the movement thereof is effective to cause said engaging end to bear upon the cam surface of said bait carrier thereby urging said bait carrier to said set position wherein said engaging end engages said catch, said trigger arm further including means for releasably engaging said minor loop so that minor loop movement in a direction opposing said spring means moves said trigger arm so as to effect an engagement of said engaging end with said catch.

2. The rodent trap of claim 1 wherein said bait carrier includes a flap constructed of magnetic material fixed to said bait carrier, and wherein said bias means is comprised of a magnet fixed to said base at a position such that the attraction between said flap and said magnet urges said bait carrier to said initial position.

3. The rodent trap of claim 2 wherein said flap is fixed to said bait carrier in such a manner that when said carrier is moved from said initial position to said set position by the action of said trigger arm end engaging said cam surface, said flap is moved away from said magnet an amount sufficient to substantially reduce the magnetic attraction therebetween.

4. The rodent trap of claim 1 wherein said trigger arm is constructed of a stiff wire, one end thereof being elongate and comprising said engaging end, an intermediate section thereof being serpentine in form where one loop part thereof comprises a slot for movable engagement of the minor loop on the upper and lower surfaces thereof, and the other end of said stiff wire is operably constructed to be pivotally mounted to said base.

5. In a rodent trap of the type having a base, a striking bar spring biased to a closed position against said base, a bait carrier mounted for pivotal movement at least between an initial position and a set position and operative in said set position to maintain said striking bar in an open position, a catch means fixed to said bait carrier and responsive to the movement thereof from said set position for releasing said striking bar into motion from said open position toward said closed position, the improvement comprising:

bias means for biasing said bait carrier to said intitial position with a nonlinear and inversely related force-distance relationship, whereby the force decreases as said bait carrier is moved away from said bias means.

6. The improved rodent trap as set forth in claim 5 wherein the force of said bias means is inversely related to the square of the distance between said bait carrier and said bias means.

7. The improved rodent trap as set forth in claim 5 wherein said bias means is comprised of:

a magnet fixed to said base; and magnetic means mounted to said bait carrier in such a manner as to be under the influence of the magnetic field of said magnet for biasing said bait carrier to said initial position.

8. The improved rodent trap as set forth in claim 7 wherein in said set position, there is an air gap between said magnetic means and said magnet.

9. The improved rodent trap as set forth in claim 8 wherein said air gap is of sufficient width such that the magnetic force of said magnet is sufficient to slightly bias said bait carrier toward said initial position.

10. The improved rodent trap as set forth in claim 7 wherein said bait carrier is mounted for further movement to an initial position, and wherein in said initial position there is no air gap between said magnet and said magnetic means.

11. The improved rodent trap as set forth in claim 7 further including a trigger arm engageable with said catch means when said bait carrier is in the set position, and engageable with said striking bar, and wherein the engaging surface areas between said trigger arm and said catch means are of diverse configuration such that the contact area therebetween is minimized.

12. The improved rodent trap as set forth in claim 11 wherein one said surface configuration is flat and the other said surface configuration is rounded.

13. The improved rodent trap as set forth in claim 7 wherein said bait carrier further includes a bait arm for retaining bait, and wherein said bait arm and said magnetic means are of substantially the same weight and are each mounted on opposite sides of said bait carrier so as to balance said bait carrier, whereby the only biasing force on said bait carrier is that of said magnet.

* * * * *